(12) United States Patent
Rejda et al.

(10) Patent No.: US 9,036,298 B2
(45) Date of Patent: May 19, 2015

(54) METHODS AND DEVICES TO CONTROL WRITE POLE HEIGHT IN RECORDING HEADS

(75) Inventors: Edwin Frank Rejda, Bloomington, MN (US); Huaqing Yin, Eden Prairie, MN (US); Marc Perry Ronshaugen, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 535 days.

(21) Appl. No.: 12/511,636

(22) Filed: Jul. 29, 2009

(65) Prior Publication Data

US 2011/0026158 A1  Feb. 3, 2011

(51) Int. Cl.
G11B 5/127 (2006.01)
G11B 5/31 (2006.01)
G11B 5/187 (2006.01)
G11B 5/60 (2006.01)

(52) U.S. Cl.
CPC ............ *G11B 5/3169* (2013.01); *G11B 5/1278* (2013.01); *G11B 5/1871* (2013.01); *G11B 5/3116* (2013.01); *G11B 5/3133* (2013.01); *G11B 5/3163* (2013.01); *G11B 5/6005* (2013.01)

(58) Field of Classification Search
USPC ..................................................... 360/125.02
See application file for complete search history.

(56) References Cited

U.S. PATENT DOCUMENTS

| | | | |
|---|---|---|---|
| 5,710,683 A | 1/1998 | Sundaram | |
| 6,445,537 B1 * | 9/2002 | Cates | 360/125.72 |
| 6,628,478 B2 | 9/2003 | Gill | |
| 6,920,016 B2 | 7/2005 | Yamakura et al. | |
| 7,042,677 B2 | 5/2006 | Ohtomo et al. | |
| 7,181,828 B2 | 2/2007 | Yazawa et al. | |
| 7,974,046 B2 | 7/2011 | Ota et al. | |
| 2002/0078551 A1 * | 6/2002 | Ohtsuka | 29/603.07 |
| 2004/0257702 A1 * | 12/2004 | Kimura et al. | 360/126 |
| 2006/0102956 A1 * | 5/2006 | Kamarajugadda et al. | 257/359 |
| 2006/0245116 A1 * | 11/2006 | Klostermann et al. | 360/324.2 |
| 2007/0127159 A1 | 6/2007 | Sugiura et al. | |
| 2007/0183093 A1 | 8/2007 | Le et al. | |
| 2007/0217069 A1 * | 9/2007 | Okada et al. | 360/126 |
| 2009/0002885 A1 * | 1/2009 | Sin | 360/125.02 |
| 2009/0190256 A1 * | 7/2009 | Schabes et al. | 360/121 |
| 2010/0112486 A1 * | 5/2010 | Zhang et al. | 430/314 |

FOREIGN PATENT DOCUMENTS

| | | |
|---|---|---|
| JP | 07-326020 A | 12/1995 |
| JP | 09-128711 A | 5/1997 |
| JP | 2000-087011 A | 3/2000 |
| JP | 2005071430 A | 3/2005 |
| JP | 2005-317069 A | 11/2005 |
| JP | 2007153653 A | 6/2007 |
| JP | 2007213784 A | 8/2007 |
| JP | 2008123654 A | 5/2008 |

* cited by examiner

*Primary Examiner* — Wayne Young
*Assistant Examiner* — Carlos E Garcia
(74) *Attorney, Agent, or Firm* — Westman, Champlin & Koehler, P.A.

(57) ABSTRACT

Recording heads for data storage systems are provided. Recording heads illustratively include a write pole, a bumper, a dielectric layer, and a surface. In some embodiments, a portion of the surface includes portions of the write pole, bumper, and dielectric layer. The write pole, bumper, and dielectric layer are illustratively made from materials that have polishing rates. In some embodiments, the polishing rate for the write pole material is more similar to the polishing rate for the bumper material than it is to the polishing rate for the dielectric layer material.

19 Claims, 7 Drawing Sheets

METHODS AND DEVICES TO CONTROL WRITE POLE HEIGHT IN RECORDING HEADS

BACKGROUND

Data storage systems commonly use recording heads to write information to storage media and to read information from storage media. In the writing process, recording heads generate a magnetic field. One factor in determining the strength of the magnetic field on the storage media is the distance of the recording head write pole to the storage media. If the write pole is too far from the storage media, the magnetic field may be too weak to write efficiently. If the write pole is too close to the storage media, the write pole may make physical contact with the storage media and be damaged.

SUMMARY

Recording heads for data storage systems are provided. Recording heads illustratively include a write pole, a bumper, a dielectric layer, and a surface. In some embodiments, a portion of the surface includes portions of the write pole, bumper, and dielectric layer. The write pole, bumper, and dielectric layer are illustratively made from materials that have polishing rates. In some embodiments, the polishing rate for the write pole material is more similar to the polishing rate for the bumper material than it is to the polishing rate for the dielectric layer material.

DETAILED DESCRIPTION

Figure 1:
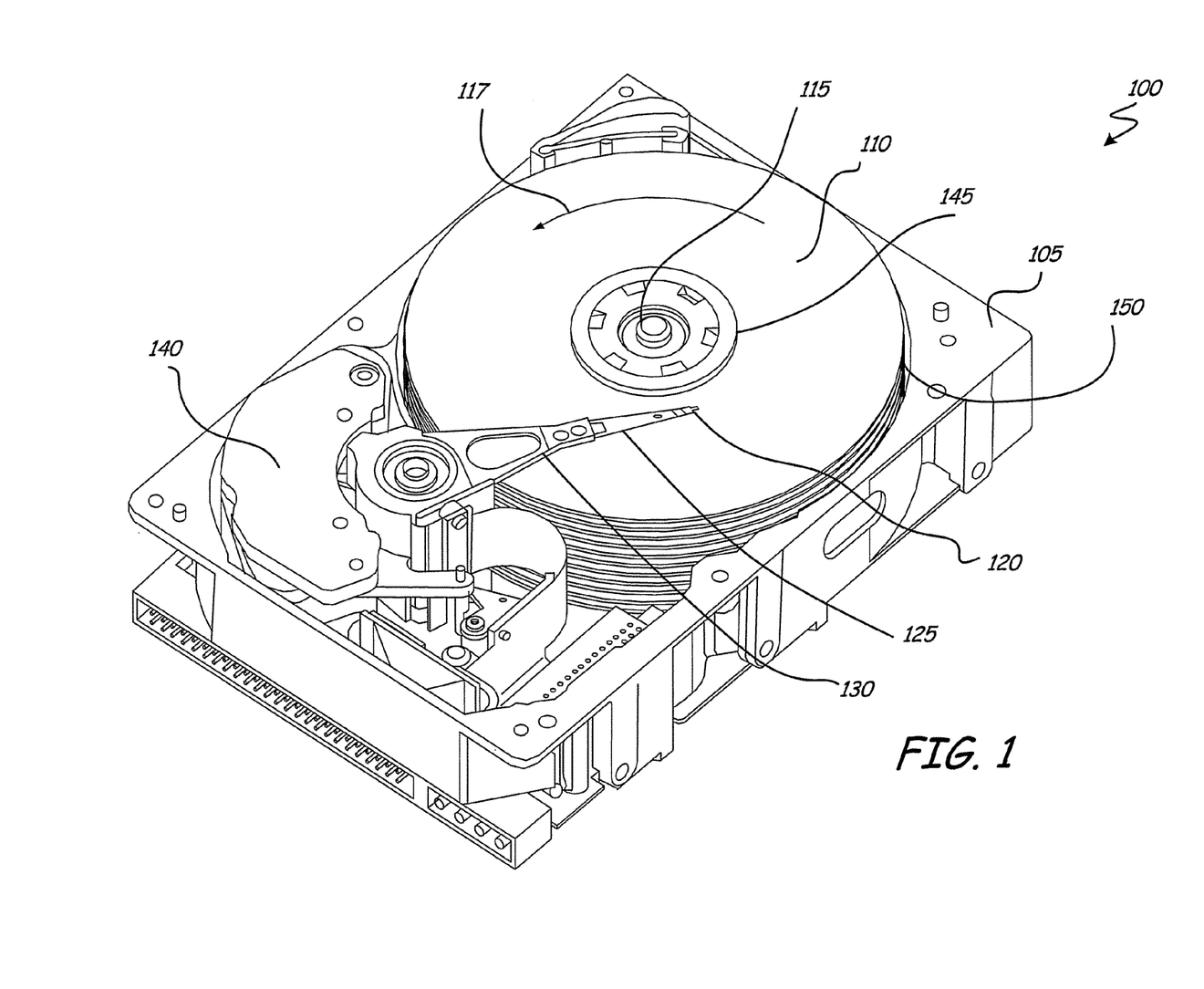
FIG. 1 is a perspective view of a hard disc drive.

FIG. 1 is a perspective view of a hard disc drive 100. Drive 100 is an example of a device in which some embodiments of the present disclosure may be incorporated. Hard disc drives are a common type of data storage system. While embodiments of this disclosure are described in terms of disc drives, other types of data storage systems should be considered within the scope of the present disclosure.

Disc drive 100 includes an enclosure 105. Disc drive 100 further includes a disc or medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in an arcuate path between a disc inner diameter 145 and a disc outer diameter 150.

Figure 2:
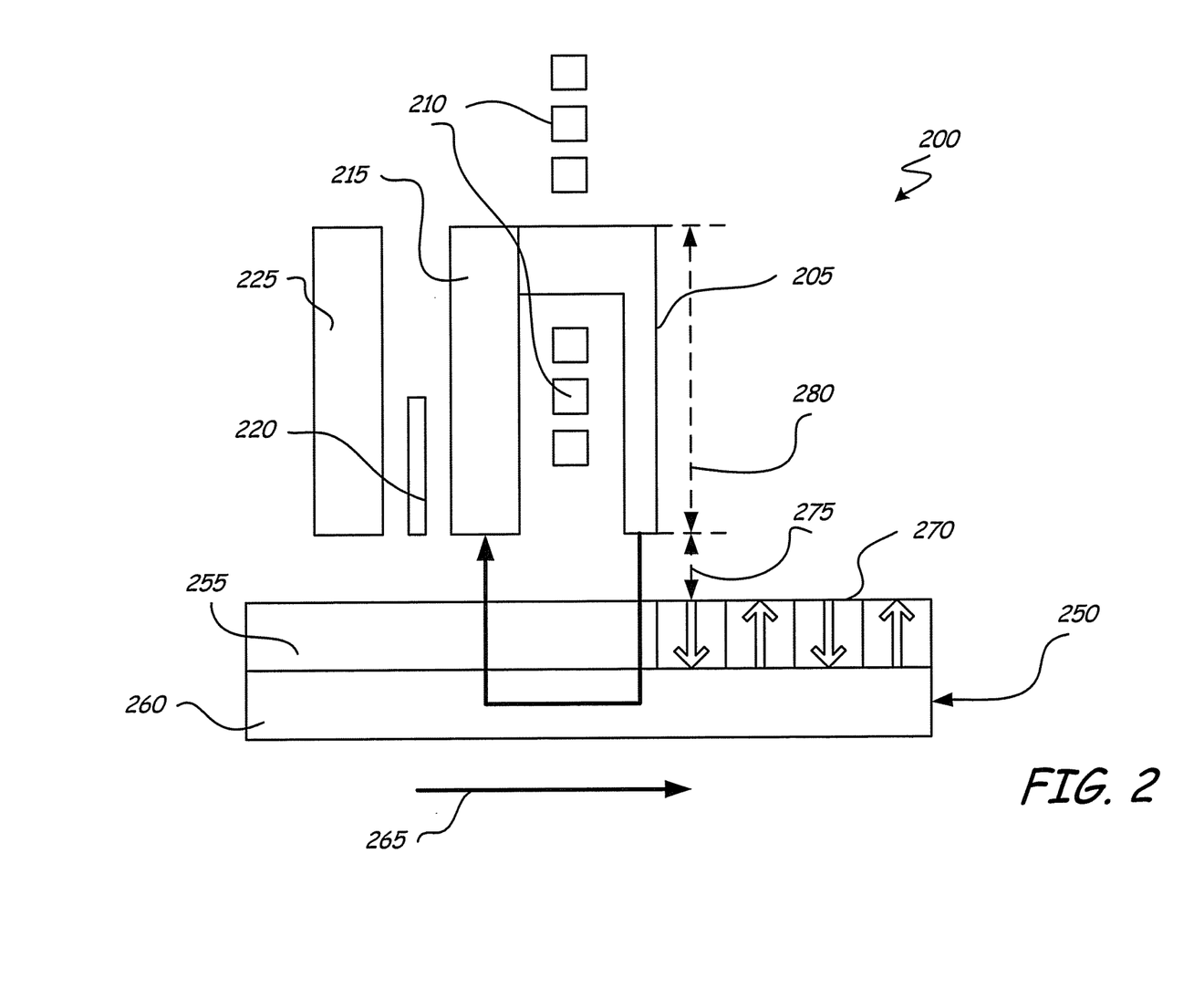
FIG. 2 is a schematic diagram of a cross-section of a recording head writing to a storage medium.

FIG. 2 is a schematic diagram of a cross-section of a recording head 200 writing to a storage medium 250. Recording head 200 is illustratively carried by a slider such as slider 120 in FIG. 1, and storage medium 250 is illustratively a storage medium such as medium 110 in FIG. 1. FIG. 2 is a simplified diagram only showing cross-sectional views of some of the read and write components of a recording head. Those skilled in the art will recognize recording heads commonly include other components. Some embodiments of the present disclosure may be practiced with recording heads such as recording head 200. Embodiments of the present disclosure are however not limited to such recording heads. Many various types of recording heads are known in the art, and embodiments of the present disclosure are not limited to any specific type of recording head. Embodiments of the present disclosure are practiced in all types of recording heads.

Recording head 200 includes a write pole 205, a magnetization coil 210, a return pole 215, a read element 220, and a bottom shield 225. Storage medium 250 includes a recording layer 255 and an underlayer 260. Storage medium 250 rotates in the direction shown by arrow 265. Arrow 265 is illustratively a direction of rotation such as arrow 117 shown in FIG. 1.

In one embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255.

FIG. 2 shows a height 275. Height 275 represents the distance between write pole 205 and the surface of storage medium 250. Height 275 is one factor that determines the strength of the magnetic field on the storage medium. As height 275 increases (i.e. the distance from pole 205 to medium 250 increases), the strength of the magnetic field decreases. If height 275 is too great, the magnetic field may be too weak to write efficiently. As height 275 decreases (i.e. the distance from pole 205 to medium 275 decreases), the strength of the magnetic field increases. However, if the write pole is too close to the storage media, the write pole may make physical contact with the storage medium and be damaged.

FIG. 2 also shows a write pole height or length 280. Length 280 influences height 275. Generally speaking, as length 280 decreases, height 275 increases. As length 280 increases, height 275 decreases. Those skilled in the art will recognize that controlling height 275 is one method of controlling the strength of the magnetic field generated by a recording head.

Figure 3:
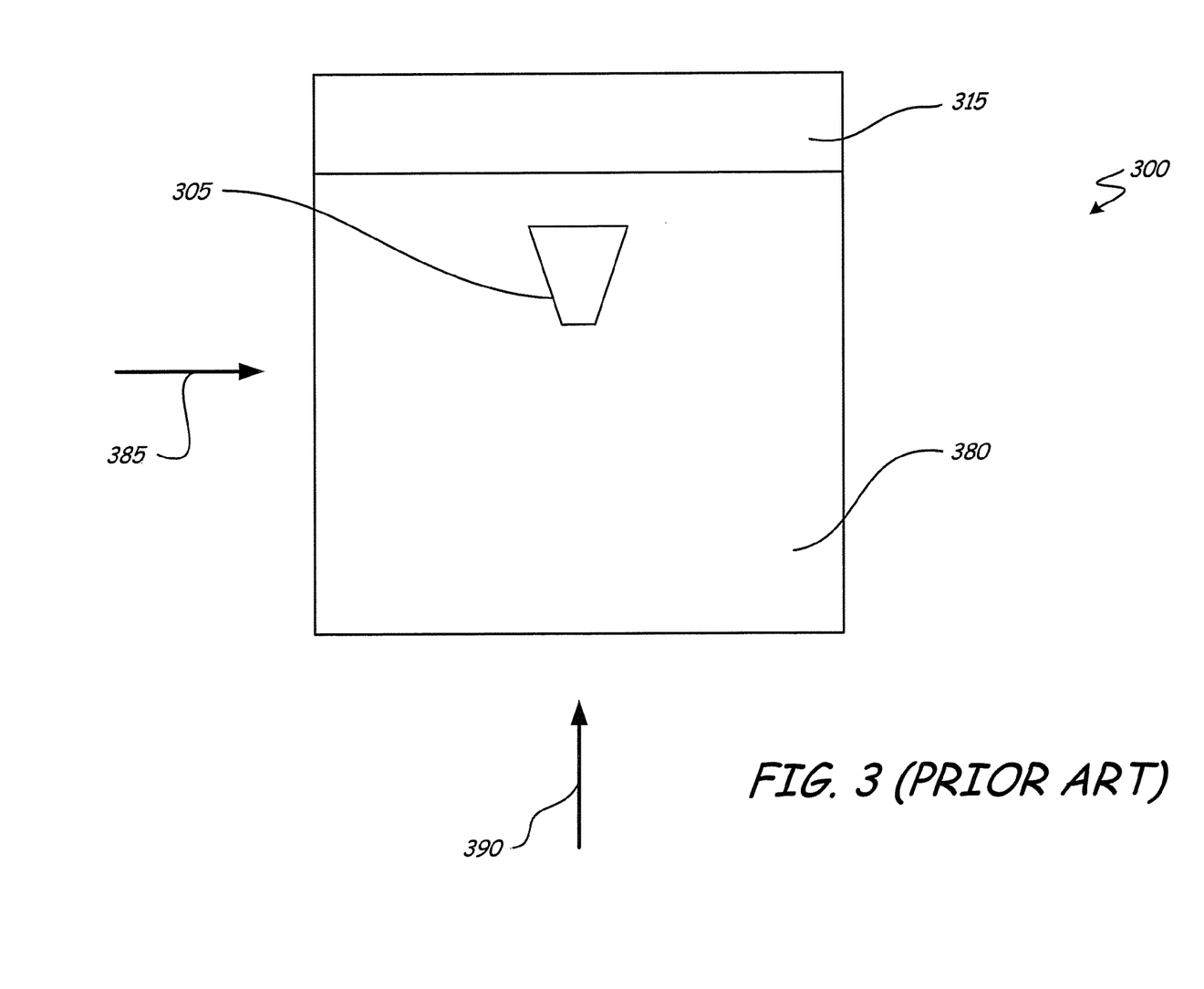
FIG. 3 is a partial schematic view of a prior art recording head.

FIG. 3 is a partial schematic view of a prior art recording head 300. Head 300 is illustratively a recording head such as head 200 in FIG. 2. FIG. 3 shows the side of the recording head that faces a storage medium such as medium 250 in FIG. 2 or medium 110 in FIG. 1. FIG. 3 shows a write pole 305, a portion of a return pole 315, and a portion of dielectric 380. FIG. 3 only shows the portion of the recording head that surrounds write pole 305. Those skilled in the art will recognize that recording heads commonly include other features such as read elements (e.g. read element 220 in FIG. 2) and bottom shields (e.g. bottom shield 225 in FIG. 2).

Write pole 305 is illustratively a write pole such as write pole 205 in FIG. 2. The portion of the return pole 315 is illustratively a portion of a return pole such as return pole 215 in FIG. 2. Dielectric 380 is illustratively made of an electrically nonconductive or isolative material. Embodiments of dielectric 380 include materials such as, but not limited to, alumina (Al2O3) or silicon dioxide (SiO2). Dielectric 380 is commonly used to electrically isolate components such as write poles, return poles, magnetization coils, and bottom shields such as those shown in FIG. 2. Dielectric 380 in FIG. 3 illustratively surrounds write pole 305 and extends beyond the region shown in FIG. 3.

In recording head manufacturing processes, recording head surfaces that face storage media such as the portion shown in FIG. 3, may be polished. In some embodiments, the surfaces are polished to remove extraneous material from the recording head that is either needed or useful in manufacturing the head. In other embodiments, the surfaces are polished in order to make recording head features such as return poles and write poles coplanar or at least more coplanar. In yet other embodiments, polishing is performed to both remove extraneous material and to make the remaining features more coplanar. Embodiments of the present disclosure are not however limited to any particular reason or use for polishing.

Additionally, embodiments are not limited to any particular methods of polishing. Embodiments are practiced in all polishing methods. Some embodiments, for illustration purposes only and not by limitation, perform polishing by chemical reactions (e.g. dissolving), some by physical contact (e.g. using an abrasive surface or particles), and some by a combination of chemical and mechanical/physical methods.

Embodiments are also not limited to any particular polishing process equipment. Illustrative examples of polishing equipment include lapping machines and chemical mechanical polishing machines. Polishing equipment commonly includes a rotating surface or surfaces that either directly or indirectly make contact with a surface being polished. Polishing equipment illustratively indirectly contacts a surface being polished through an abrasive material such as, but not limited to, a slurry. One notable difference between the various types of process equipment is that they commonly make contact with the surface being polished at different angles. Embodiments of the present disclosure accommodate all angles.

FIG. 3 includes arrows 385 and 390. Arrows 385 and 390 represent two potential polishing directions. Arrow 385 shows the surface being polished from left to right. Arrow 390 shows the surface being polished from bottom to top. The surface of recording head portion 300 can however be polished from any direction or combination of directions. In both of the polishing directions shown in FIG. 3., the dielectric 380 is polished before the write pole 305 (i.e. the polishing equipment rotating/moving surface directly or indirectly contacts the dielectric before it contacts the write pole).

In polishing processes, the rate at which a material is removed/polished can be expressed as a polishing rate. For example, a polishing rate is illustratively expressed as a number of Angstroms per a minute or a number of Angstroms per a cycle. Embodiments are not however limited to any particular method of determining or expressing polishing rates. Different materials commonly have different polishing rates. In one embodiment, a dielectric such as dielectric 380 in FIG. 3 has a higher polishing rate than a write pole such as write pole 305 in FIG. 3. This results in the dielectric material being polished or removed faster than the write pole material.

Figure 4:
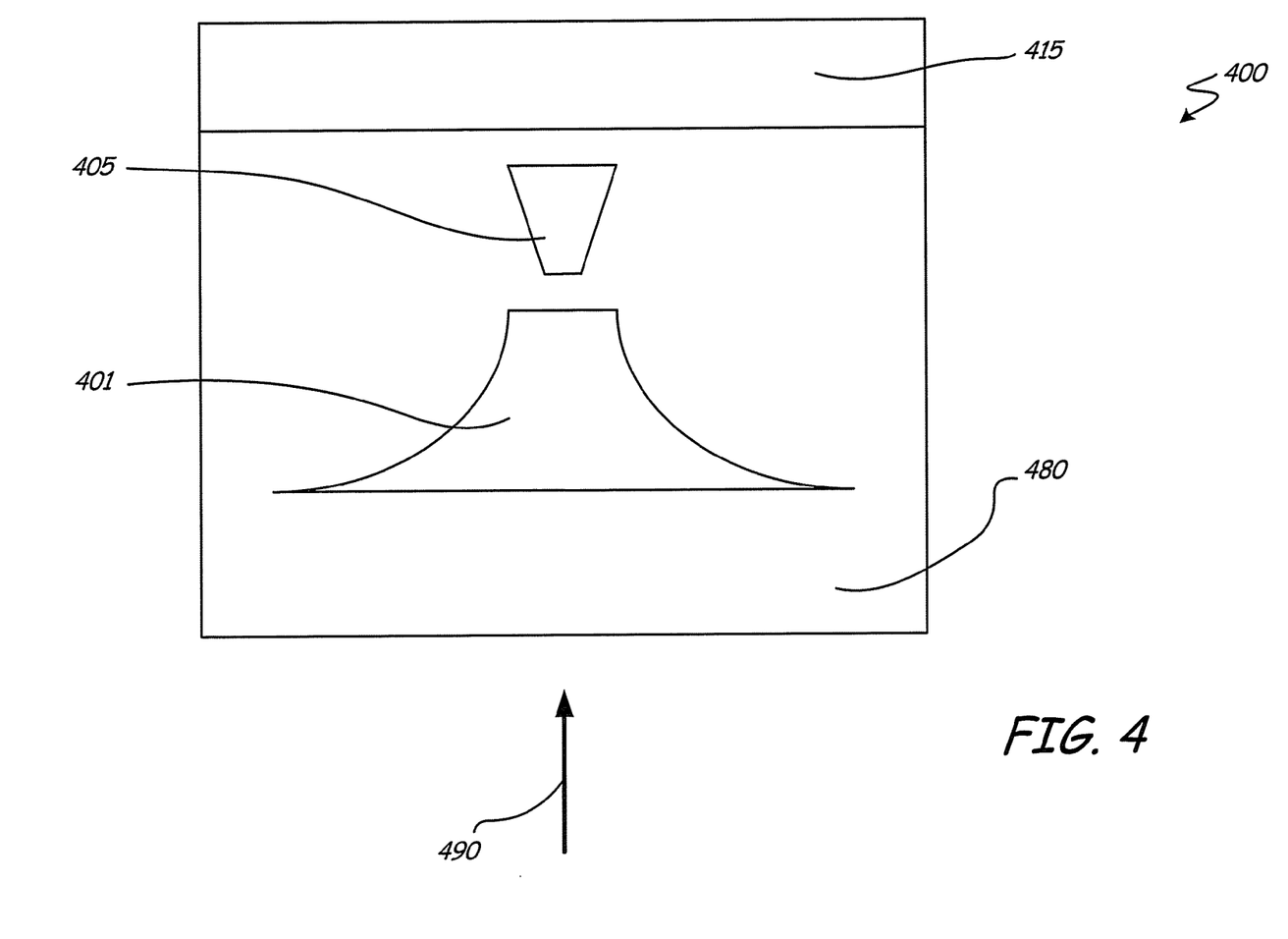
FIGS. 4-6 are partial schematic views of recording heads with bumpers.

FIG. 4 is a partial schematic view of a recording head 400. Recording head 400 includes several features similar to those of recording head 300. Recording head 400 includes a write pole 405, a portion of a return pole 415, and dielectric 480. Recording head 400 also include a bumper 401. Embodiments of bumpers such as bumper 401 are included in all types of recording heads. Bumpers are not limited to recording heads such as head 400 or head 200 in FIG. 2.

FIG. 4 includes an arrow 490. Arrow 490 represents one potential polishing direction. Embodiments of recording head 400 are polished from other polishing directions. In one embodiment, recording head 400 is polished at or exposed to several polishing directions. For example, a recording head may be polished at the direction shown by arrow 490, and also be polished at any direction plus or minus five degrees from that direction.

Some embodiments of recording heads with bumpers such as head 400, result in better polishing results than recording heads without bumpers such as head 300. For example, for illustration purposes only and not by limitation, in polishing head 300, dielectric material may be removed faster than write pole material. In such a case, the write pole receives limited support from its surrounding material (i.e. the dielectric) during the polishing process. This can result in undesirable and/or unpredictable results. For example, the resulting write pole height such as height 280 shown in FIG. 2, may be greater than or less than the desired height.

In recording heads with bumpers such as head 400, the write pole may be better supported in the polishing process. In an embodiment, the polishing rate of the bumper is more similar to the polishing rate of the write pole than a corresponding area made of dielectric (i.e. the difference between the polishing rates of the write pole and the bumper is less than the difference between the polishing rates of the write pole and the dielectric). In such an embodiment, the write pole receives more support and/or more uniform polishing forces during polishing. This results in the height of the write pole after polishing being more predictable and/or desirable. For example, for illustration purposes only and not by limitation, in some embodiments, the average write pole height for heads with bumpers is closer to a target value than heads without bumpers, and the standard deviation of heights for heads with bumpers is less than that for heads without bumpers.

Embodiments of bumpers are made from all materials and are not limited to any particular material. Bumper 401 is illustratively made from a different material than dielectric 480 and write pole 405. Some embodiments are made from chromium, nickel chromium, or ruthenium. In an embodiment, a nonmagnetic material is used such that the bumper does not interfere with the performance of the recording head. In another embodiment, a material is used that has etching properties similar to the write pole (e.g., a similar etch rate in an ion beam etching process). As was previously mentioned, in one embodiment, the bumper is made from a material that has a polishing rate that more closely matches the polishing rate of the write pole material than does the dielectric material.

Embodiments of bumpers are not limited to any particular shape or location. Those skilled in the art will recognize that various shapes and location can be used. For example, bumper 401 in FIG. 4 is separated from the write pole 405 by dielectric material 480. This spacing is optionally increased or decreased. The spacing can also be eliminated such that the bumper is adjacent to the write pole. FIG. 4 also shows bumper 401 in a particular shape. Other shapes such as, but not limited to, a rectangle are also used. Embodiments of bumpers are also located in different positions relative to the write pole. In one illustrative embodiment, the position of the bumper relative to the write pole is based at least in part on a polishing direction or directions. In one such embodiment, by illustration only and not by limitation, a bumper is placed such that it makes contact with at least a portion of a polishing machine before the polishing machine makes contact with the write pole. For example, in an embodiment, the polishing direction is from left to right, and the bumper is to the left of the write pole. In some embodiments, bumpers are shaped such that they support a write pole from a plurality of polishing directions.

Figure 5:
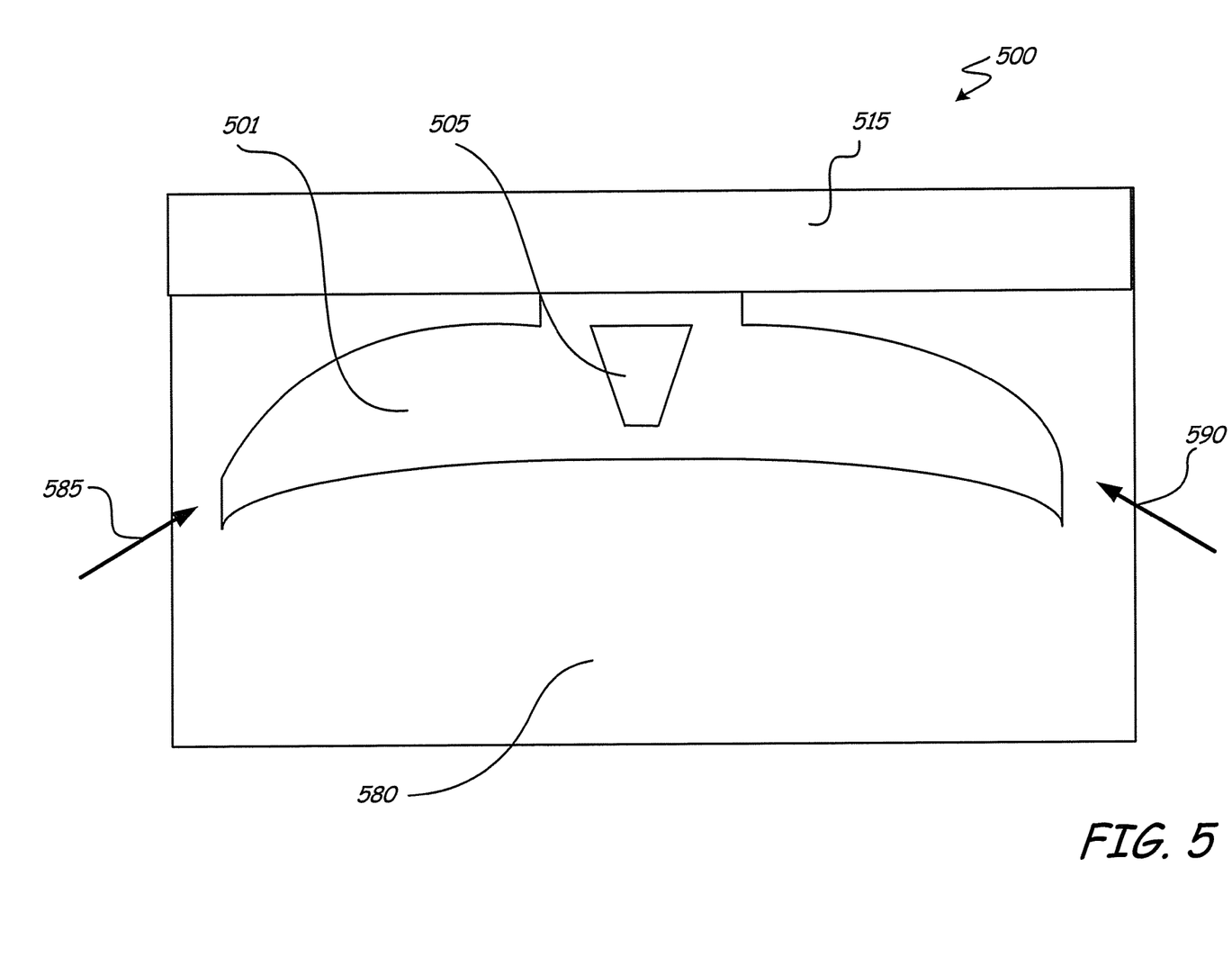
Figure 6:
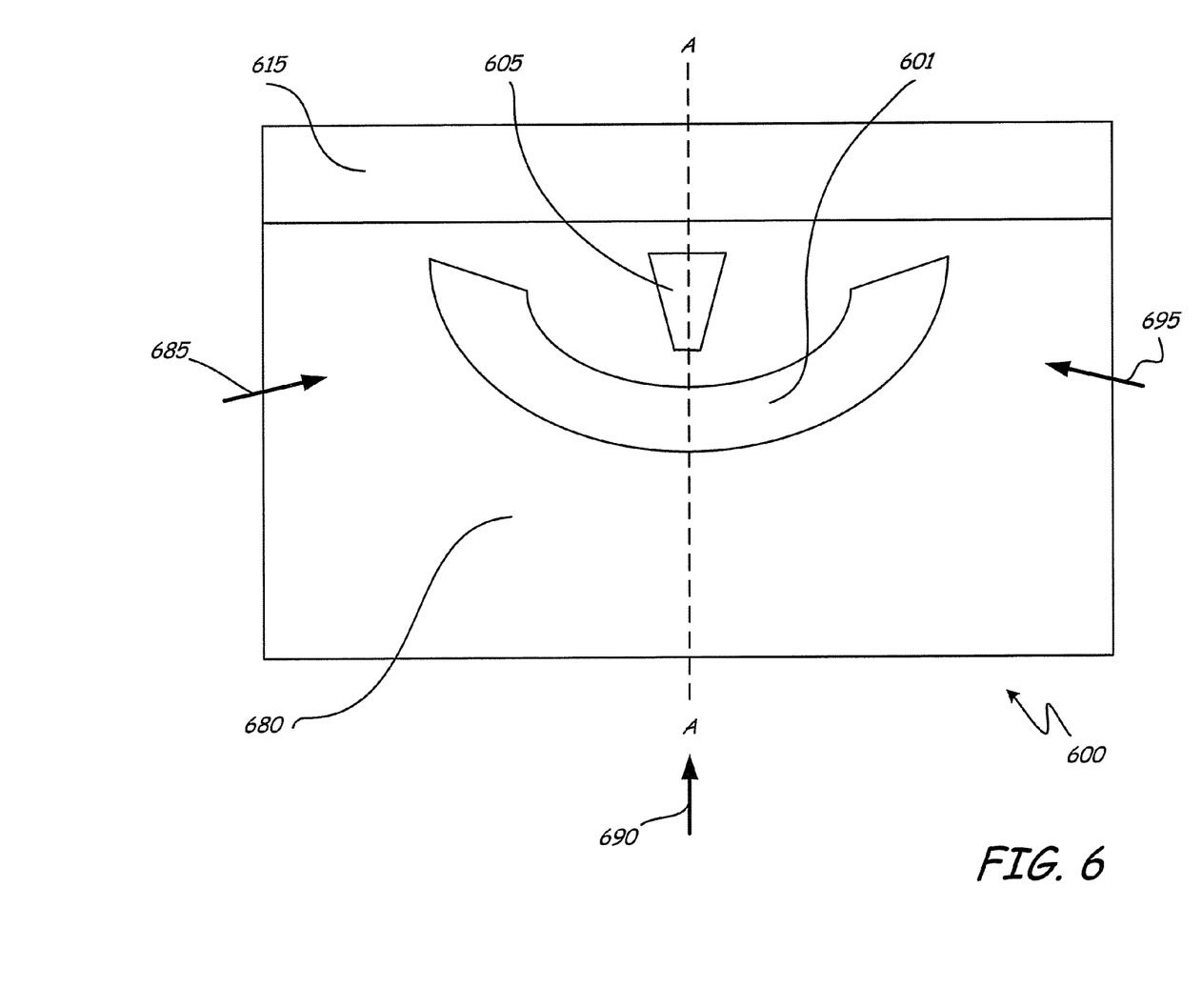

FIGS. 5 and 6 show two additional illustrative embodiments of bumpers. FIG. 5 is a partial schematic view of a recording head 500. It includes a write pole 505, a portion of a return pole 515, dielectric 580, and a bumper 501. FIG. 5 includes two arrows 585 and 590. The arrows represent illustrative polishing directions in which bumper 501 supports write pole 505.

FIG. 6 is a partial schematic view of a recording head 600. It includes a write pole 605, a portion of a return pole 615, dielectric 680, and a bumper 601. FIG. 6 includes three arrows 685, 690, and 695. The arrows represent illustrative polishing directions in which bumper 601 supports write pole 605. It is worth noting that write pole 605 is supported by bumper 601 from a variety of different polishing angles. For example, bumper 601 supports pole 605 in all the angles between arrow 685 and arrow 695.

Figure 7:
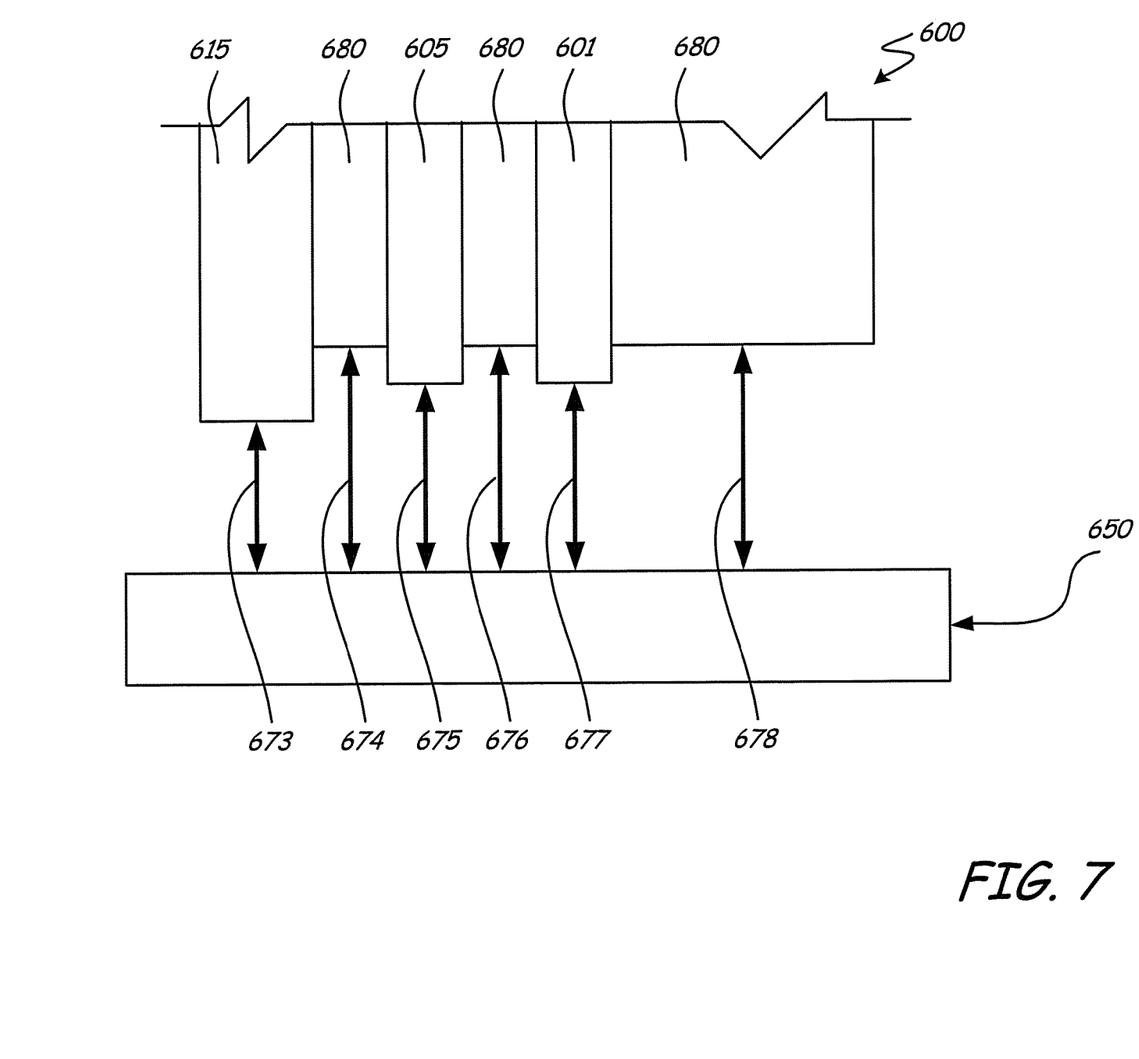
FIG. 7 is a schematic cross-section of a recording head with a bumper facing a storage medium.

FIG. 7 is an illustrative schematic cross-section of recording head 600 at line A-A in FIG. 6 facing a storage medium 650. Storage medium 650 is illustratively a storage medium such as medium 250 in FIG. 2. FIG. 7 illustrates relative heights between the surfaces shown in FIG. 6 and a storage medium. Height 675 is an illustrative height between the write pole 605 and the storage medium. Height 675 corresponds to height 275 shown in FIG. 2. Accordingly, the strength of a magnetic field on the storage medium increases as height 275 decreases and decreases as height 275 increases. As noted previously, in some embodiments of recording heads with bumpers, the distance or height between the write pole and the storage medium is better controlled as compared to recording heads without bumpers.

FIG. 7 also includes height 673 that represents a distance between the return pole 615 and the storage medium. Height 677 that represents the distance between bumper 601 and the storage medium. Finally, Heights 674, 676, and 678 represent distances between portions of the dielectric surface and the storage medium.

The relative heights/distances shown in FIG. 7 are for illustration purposes only and embodiments of the present disclosure are not limited to any particular heights. Relative heights may vary based on many factors such as, but not limited to, the types of materials used to make the read pole, return pole, bumper, and dielectric, the type of polishing process used, and the type of polishing process equipment used. In some embodiments the relative heights may also vary due to process variations (i.e. heads made with the same process may have different relative heights).

The relative heights shown in FIG. 7 can also be viewed as representing the relative planarity of the surfaces. For example, if all of the surfaces were at the same height, then all of the surfaces would be in or close to being in the same plane (i.e. coplanar). In some embodiments of recording heads with bumpers, the bumpers help to improve the relative coplanarity of write pole surfaces. For example, for illustration purposes only and not by limitation, in some embodiments of recording heads with bumpers, the distance between the plane of the write pole and the plane of other features such as the return pole is less than it would be without the bumper. It should be noted that the plane of the write pole can be either above or below the plane of other features such as the return pole. Bumpers illustratively improve the coplanarity in both cases.

Although the preceding paragraphs discussed the planarity of recording head surfaces in reference to recording head 600, those skilled in the art will recognize that the discussion also applies to other recording heads with bumpers such as, but not limited to, recording head 400 in FIG. 4 and recording head 500 in FIG. 5.

Embodiments of bumpers and recording heads that include bumpers, are not limited to any particular manufacturing process. In one embodiment, for illustration only, and not by limitation, the bumper material is deposited using a sputter process and the excess material is removed using photolithography and etch processing.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A recording head comprising:
   a write pole;
   a return pole;
   a bumper;
   a dielectric layer that is between the write pole and the bumper, and that is between the write pole and the return pole; and
   a surface that includes a portion of the write pole, a portion of the bumper, a portion of the return pole, and a portion of the dielectric layer, such that the write pole and the bumper are completely surrounded by the dielectric layer at the surface, wherein the write pole, the bumper, and the dielectric layer are each made from a material that has a polishing rate, and the polishing rate for the write pole material being more similar to the polishing rate for the bumper material than it is to the polishing rate for the dielectric layer material.

2. The recording head of claim 1 wherein the recording head is manufactured with a process that includes a polishing step, wherein the polishing step has associated angles of contact, wherein the location of the bumper relative to the write pole is based at least in part on the angles of contact, and wherein the surface that includes the portions of the write pole, the bumper, the return pole, and the dielectric layer is configured to face a recording medium.

3. The recording head of claim 1 wherein the portion of the write pole is more coplanar with the portion of the bumper than it is with the portion of the dielectric layer, and wherein the dielectric layer surrounds the write pole at the surface such that the write pole is not in contact with either the bumper or the return pole at the surface.

4. The recording head of claim 1 and further comprising a bottom shield.

5. The recording head of claim 1 wherein the bumper material is nonmagnetic.

6. The recording head of claim 5 wherein the bumper material comprises chromium.

7. The recording head of claim 5 wherein the bumper material comprises nickel.

8. The recording head of claim 5 wherein the bumper material comprises ruthenium.

9. A recording head comprising:
a surface that is polished from at least one direction;
a write pole having a portion on the surface that is surrounded on each of its sides by a dielectric material; and
a bumper having a portion on the surface, the portion of the bumper and the portion of the write pole being aligned to the at least one direction such that the portion of the bumper is polished before the portion of the write pole, and the bumper being separated from the write pole by the dielectric material, such that the write pole and the bumper are completely surrounded by the dielectric layer at the surface.

10. The recording head of claim 9 wherein the surface is polished from a plurality of directions, wherein the portion of the bumper and the portion of the write pole are aligned to the plurality of directions such that the portion of the bumper is polished before the portion of the write pole, and wherein the bumper and the dielectric material are completely separated from each other at the surface of the recording head.

11. The recording head of claim 10 wherein polished before comprises making contact with a portion of a polishing machine first, and wherein the recording head further comprises:
a return pole that is separated from the write pole by the dielectric material.

12. The recording head of claim 10 wherein polished before comprises indirect contact, and wherein the surface is configured to face a recording medium.

13. The recording head of claim 10 wherein the portion of the bumper comprises a nonmagnetic material.

14. A recording head comprising:
a write pole;
a return pole;
a read element;
a bumper, the write pole and the bumper being separated at least in part from the read element by the return pole; and
a dielectric layer that separates the write pole and the bumper and that separates the write pole and the return pole, such that the write pole and the bumper are completely surrounded by the dielectric layer at a surface that includes a portion of the write pole, a portion of the bumper, a portion of the return pole, and a portion of the dielectric layer.

15. The recording head of claim 14 wherein the write pole is between a portion of the bumper and a portion of the return pole on a surface of the recording head that is configured to face a recording medium.

16. The recording head of claim 14 wherein the bumper is made at least in part from a different material than the write pole.

17. The recording head of claim 16 wherein the dielectric layer is made at least in part from a different material than the write pole and the bumper.

18. The recording head of claim 17 wherein the bumper material is nonmagnetic.

19. A recording head comprising:
a write pole;
a return pole;
a bumper;
dielectric material that separates the write pole from the return pole and the bumper; and
a surface that includes a portion of the write pole, a portion of the bumper, a portion of the return pole, and a portion of the dielectric layer, such that the write pole and the bumper are completely surrounded by dielectric material at the surface.

* * * * *